US005779216A

United States Patent [19]

Grace et al.

[11] Patent Number: 5,779,216

[45] Date of Patent: Jul. 14, 1998

[54] POWER TOOL TORQUE AND WEIGHT BALANCING APPARATUS

[75] Inventors: Gregory J. Grace, Richfield; David A. Lemaster, Northfield Center, both of Ohio

[73] Assignee: Ohio Tool Systems, Inc, Richfield, Ohio

[21] Appl. No.: 558,674

[22] Filed: Nov. 16, 1995

[51] Int. Cl.$^6$ .................... F16M 11/00

[52] U.S. Cl. .................... 248/651; 248/323; 248/333; 248/654

[58] Field of Search .................... 248/579, 610, 248/317, 323, 326, 327, 333, 334.1, 654, 652

[56] References Cited

U.S. PATENT DOCUMENTS

| | | | |
|---|---|---|---|
| 657,423 | 9/1900 | Kent | 248/323 |
| 1,085,947 | 2/1914 | Smith | 248/326 |
| 1,761,832 | 6/1930 | Johansson | 248/326 |
| 2,115,898 | 5/1938 | Zagora | 248/326 |
| 3,054,611 | 9/1962 | Thon | 248/326 X |
| 4,274,495 | 6/1981 | Otto | 173/162.1 |
| 4,591,128 | 5/1986 | Karlichek et al. | 248/652 |
| 4,901,967 | 2/1990 | Petre | 248/327 |
| 5,016,851 | 5/1991 | Koskinen et al. | 248/278.1 |

FOREIGN PATENT DOCUMENTS

| | | | |
|---|---|---|---|
| 575252 | 5/1959 | Canada | 248/327 |

*Primary Examiner*—Derek J. Berger
*Attorney, Agent, or Firm*—Dougherty & Dremann

[57] ABSTRACT

An improved power tool torque and weight balancing apparatus for use in in-line assembly processes that require power tools, such as in the assembly of automotive engines. The power tool and weight balancing apparatus consists of a pivoting mounting frame, either suspended from a rail or fixedly mounted on a four-roller trolley, attached to a balancer frame that holds an air or spring powered balancer mechanism. The balancer mechanism has a cable with a swivel connector attachment which travels inside a set of telescoping tube members and attaches to a mechanism for holding a power tool. The mechanism for holding a power tool may hold a horizontally or vertically mounted power tool and is pivotable 360 degrees for operator convenience.

7 Claims, 7 Drawing Sheets

POWER TOOL TORQUE AND WEIGHT BALANCING APPARATUS

FIELD OF THE INVENTION

The present invention relates to apparatus for balancing power tool reaction forces known to occur during the operation of a power tool in an in-line assembly process, and more particularly to a power tool torque and weight balancing apparatus.

BACKGROUND OF THE INVENTION

During the in line assembly process, many components must be attached to others by the use of power tools. These power tools may have a large mass and weight and can be difficult to handle. The use of power tools is particularly common in the automotive industry, for example, during the assembly of an automobile engine which is assembled component by component as it travels along an assembly line. When a power tool is used to tighten bolts on engines, a reaction torque is produced and transmitted to the operator. Studies have shown that the torque produced contributes to certain forms of Cumulative Trauma Disorders.

In addition to the torque produced, the repetitive nature of the assembly process and the high rate of assembly speed necessary to meet production requirements contribute to the power tool operator's discomfort. An operator must have the flexibility of moving the power tool in multiple directions as well as having the torque neutralized in order to improve the efficiency of the in-line assembly process.

DESCRIPTION OF THE PRIOR ART

Applicant is aware of the following U. S. Patents concerning tool balancing devices.

| U.S. Pat. No. | Inventor | Issue Date | Title |
|---|---|---|---|
| 4,274,495 | Otto | 06-23-1981 | TOOL BALANCING APPARATUS |
| 4,591,128 | Karlichek | 05-27-1986 | TOOL REACTION BALANCING MECHANISM |

Otto, U.S. Pat. No. 4,274,495, comprises a hydropneumatic arrangement for balancing the weight of a tool, such as an assembly tool, and allows movement of the tool only in the vertical direction and along the support rails.

Karlichek, U.S. Pat. No. 4,591,128, consists of a fluid-pressure reaction and balancing system and an articulated arm, wherein the arm is suspended from dual overhead rails by a traveling bridge allowing the tool to move in a linear path.

SUMMARY OF THE INVENTION

The invention provides apparatus for balancing power tool reaction forces, making it easier for an assembly line operator to move the tool to the exact location required in the operation, thus improving both the productivity and comfort of the operator.

The invention includes a mounting frame which is normally suspended from an I-beam. This mounting frame is attached to a balancer mechanism, the balancer mechanism and all attachments thereto being pivotable about the vertical centerline of the mounting frame. The balancer mechanism has a cable and swivel connector attached to the end of the cable. The swivel connector travels inside a pair of telescoping tubes and attaches to a tool holding mechanism. This arrangement allows the tool holding mechanism to rotate 360 degrees and concurrently move both horizontally and vertically in relation to the work area.

It will be understood that the power tool balancing apparatus of the invention may be used in many configurations including suspending the unit from a fixed rail.

OBJECTS OF THE INVENTION

The principal object of the present invention is to provide an improved method of balancing the torque and weight forces of a power tool during its operation.

A further object of this invention is to provide a device for supporting both vertically and horizontally mounted power tools.

Another object of the invention is to provide a tool supporting device, the mounting of which is fixed or movable in relation to the workpiece.

BRIEF DESCRIPTION OF THE DRAWINGS

The foregoing and other objects will become more readily apparent by referring to the following detailed description and the appended drawings in which.

DETAILED DESCRIPTION

Figures 1, 9:
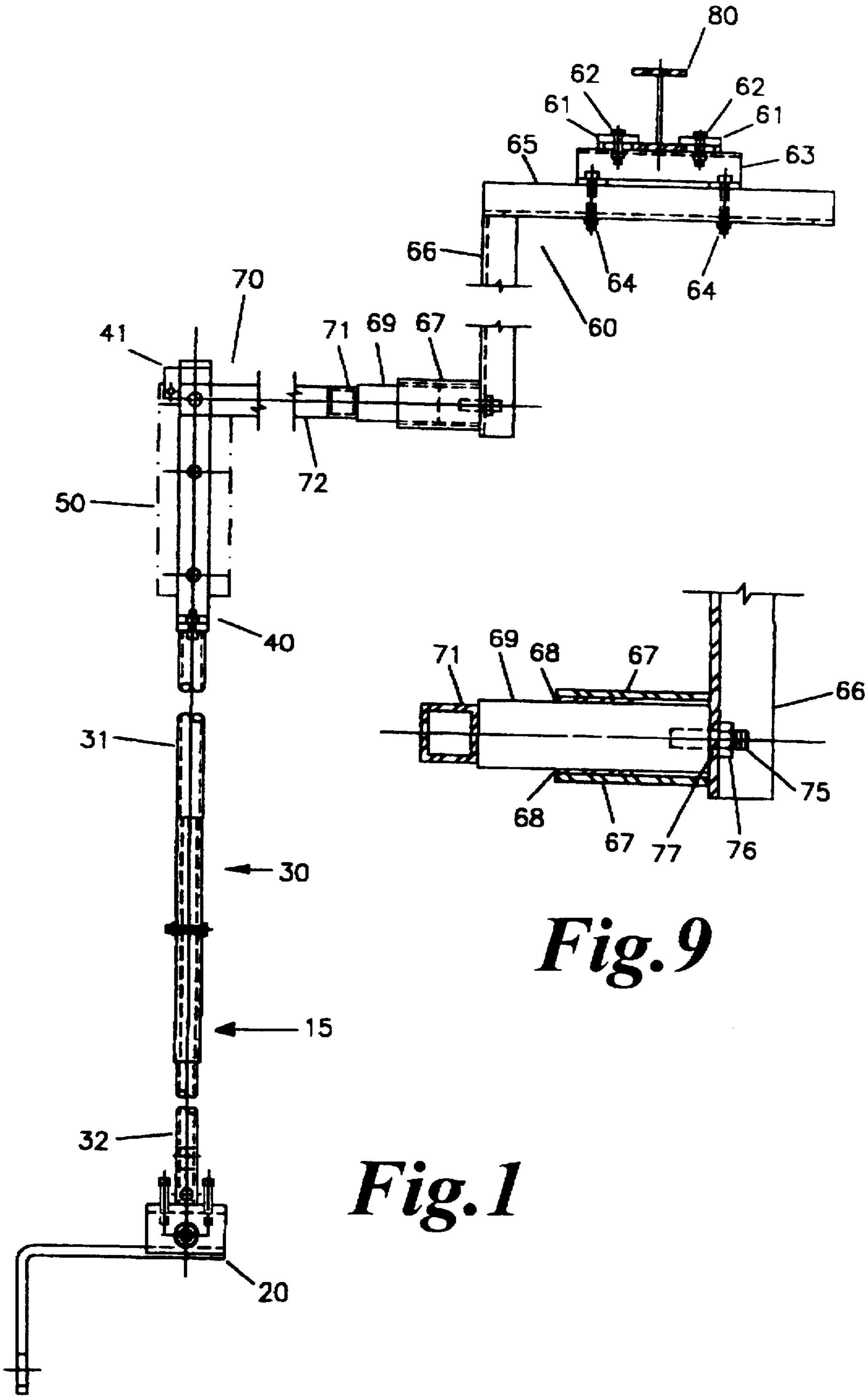
Figure 1 is a side elevational view of a first embodiment of the invention.
FIG. 9 is an enlarged partial cross-sectional view of the upper pivot member shown in FIG. 1.
Figure 5:
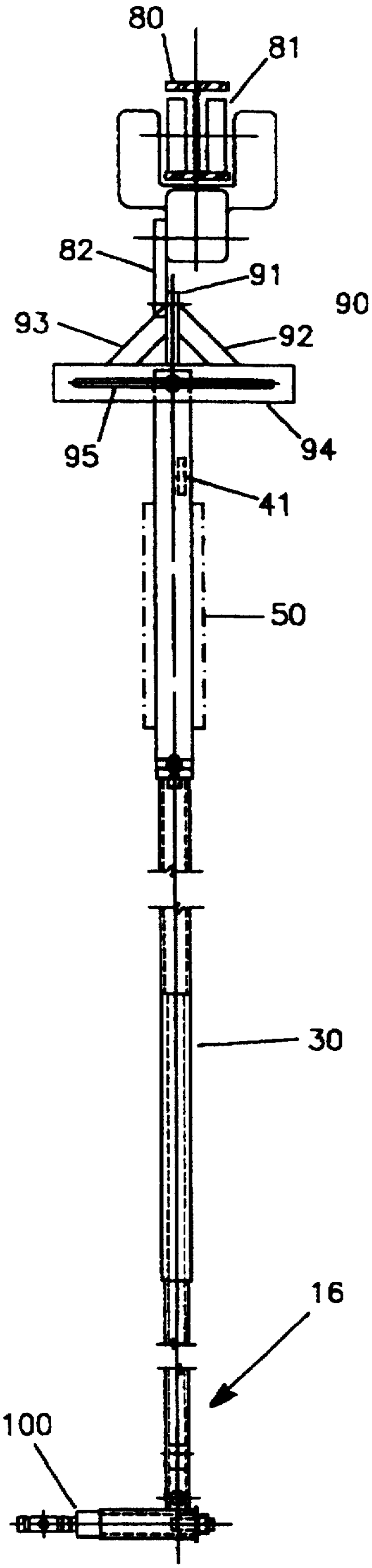
FIG. 5 is a side elevational view of the second embodiment of the invention.
Figure 6:
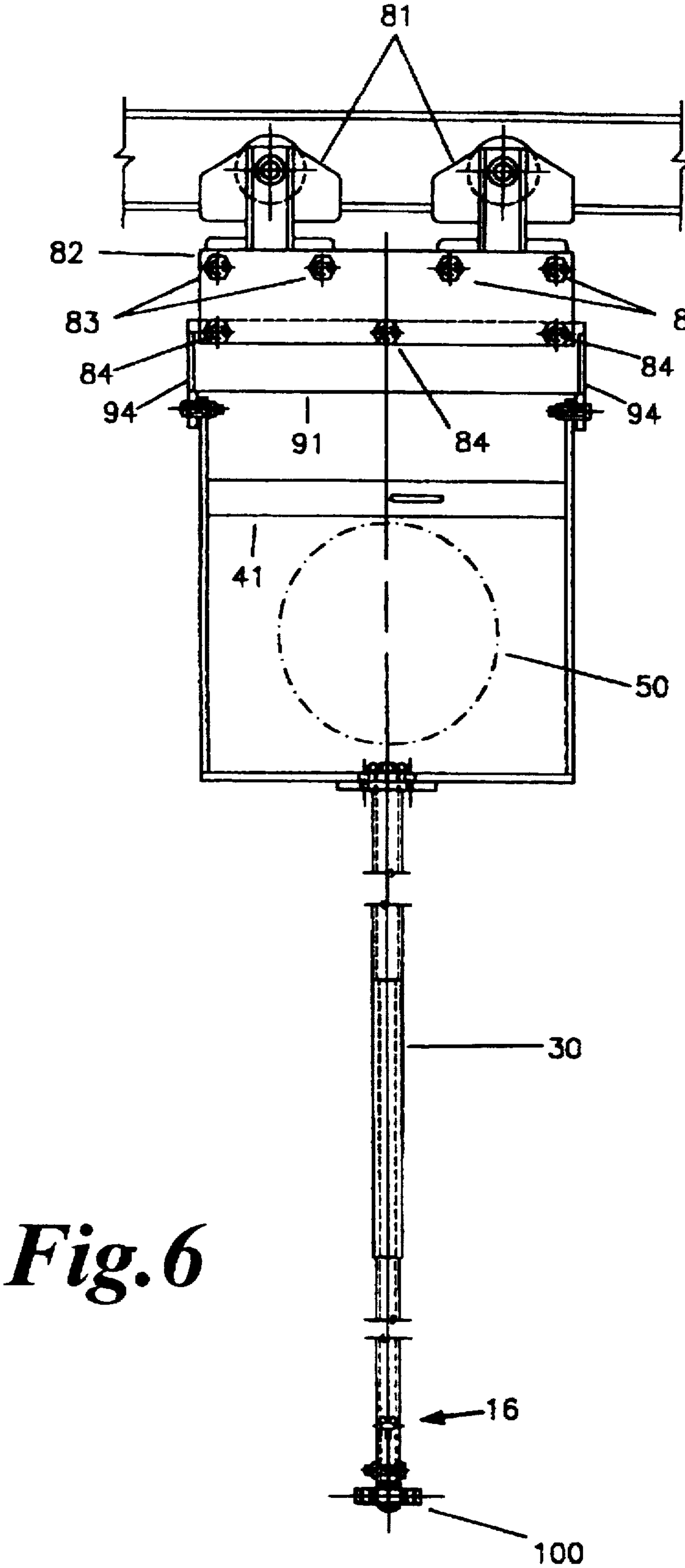
FIG. 6 is a front view of the invention according to Figure 5.

Referring now to the drawings, and particularly to FIG. 1, which shows a preferred first embodiment of the invention, a power tool torque and weight balancing device 15 consists of a first mechanism 20 for holding power tool telescoping tube members 30 including inner tube 32 and outer tube 31, a balancer frame 40 with balancer 50, and a first mounting frame 60 suspended from an I-beam 80. The first mounting frame 60 in this first embodiment is fixedly attachable to I-beam 80, but may be suspended from a rail by use of a four-roller trolley arrangement 81 as shown in FIGS. 5 and 6.

The first mounting frame 60 is attached to I-beam 80 by clips 61. The clips 61 are secured by a nut and bolt arrangement 62 to channel 63 which in turn is attached by another nut and bolt arrangement 64 to slotted channel 65. Slotted channel 65 allows the power tool and weight balancing device 15 to be adjusted horizontally with respect to the location of the work piece and I-beam 80. A vertical mounted channel 66 is secured, by welding or other appropriate means, to the first end of channel 65. At the opposite end of vertical mounted channel 66, a round tubular member 67 having a transverse bore is secured by welding or other appropriate means, to accept the pivoting member 70 within the bore.

Pivoting member 70 allows the power tool torque and weight balancing device 15 to pivot about the centerline of device 15 as shown in FIGS. 1 and 9. A solid round member 69 fitted with a bushing 68 and having a stud 75 attached at one end, is seated in the transverse bore of round tubular member 67 and attaches to vertical mounted channel 66 by stud 75 passing through hole 77 provided in mounted channel 66, and retained by nut 76. The other end of solid round member 69 has a square tube 71 secured thereto by welding or other appropriate means. Attached to each end of the square tube 71 are rectangular plates 72 that are secured to the square tube 71 by welding or other appropriate means.

Figure 11:
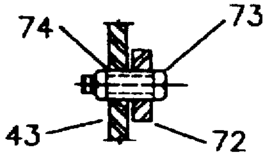
FIG. 11 is a cross-sectional view cut along the balancer support swivel shown in FIG. 2.

Balancer frame 40 is positioned on the power tool torque and weight balancing device 15 in between the rectangular plates 72 and attached to plates 72 by nut and bolt arrangement 73 through bushing 74 as shown on FIG. 11. Balancer frame 40 consists of rectangular plates 42, 43, 44 and 45 secured by welding or other appropriate means to form first balancer frame 40. Rectangular plate 42 has balancer mounting means 41 secured by welding or other appropriate means to the bottom face of rectangular plate 42 to mount balancer 50.

Figure 2:
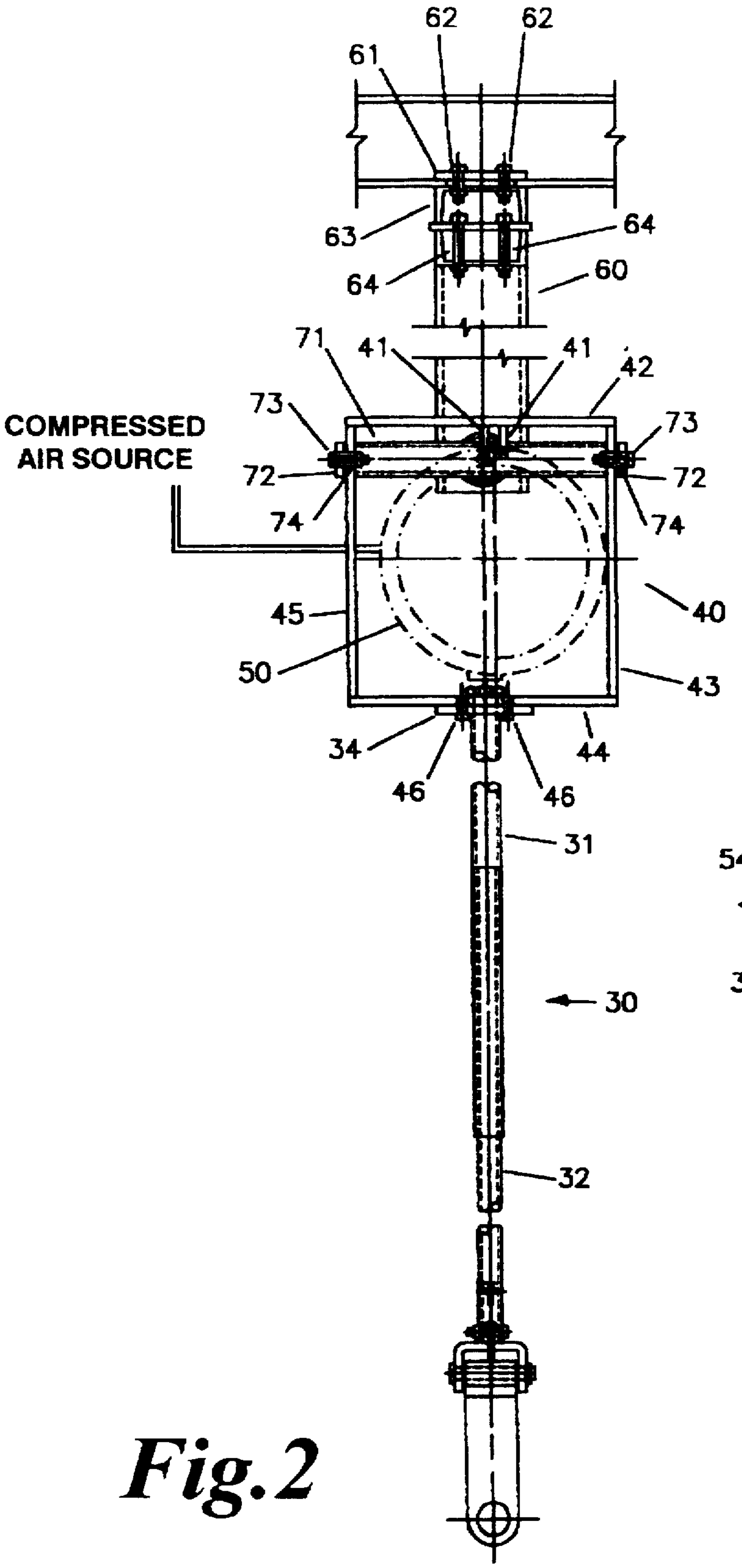
FIG. 2 is a front elevational view of the invention according to FIG. 1.

Balancer 50, which may be air powered as shown in FIG. 2 or spring powered as shown in FIG. 5, operates in a conventional manner to balance mechanism 20 or 100 for holding a power tool by maintaining the same in a weightless intermediary position as shown in FIGS. 1, 2, 5 and 6. Either an air or spring powered balancer may be utilized, and are interchangeable in either embodiment of the power tool and torque balancing device 15 or 16 as shown in FIGS. 1, 2, 5, and 6.

Figure 10:
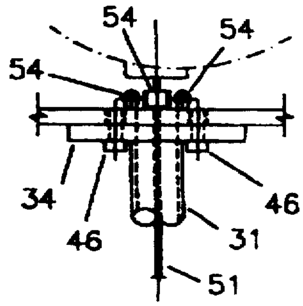
FIG. 10 is an enlarged view of a portion of FIG. 2 of the balancer cable and feed arrangement as it feeds into the telescoping tube members.
Figure 4:
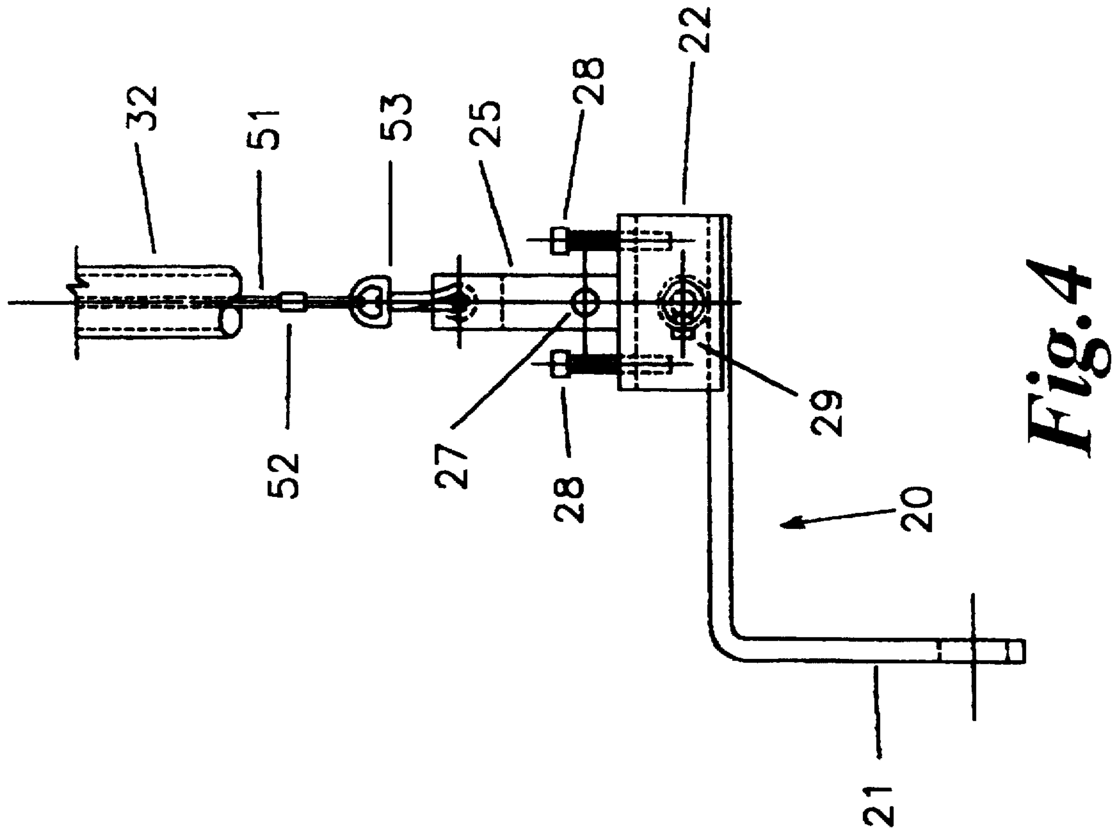
FIG. 4 is an enlarged view of the mechanism for holding a power tool of FIG. 1 showing the cable swivel connector attached to the mechanism for holding a power tool.
Figure 3:
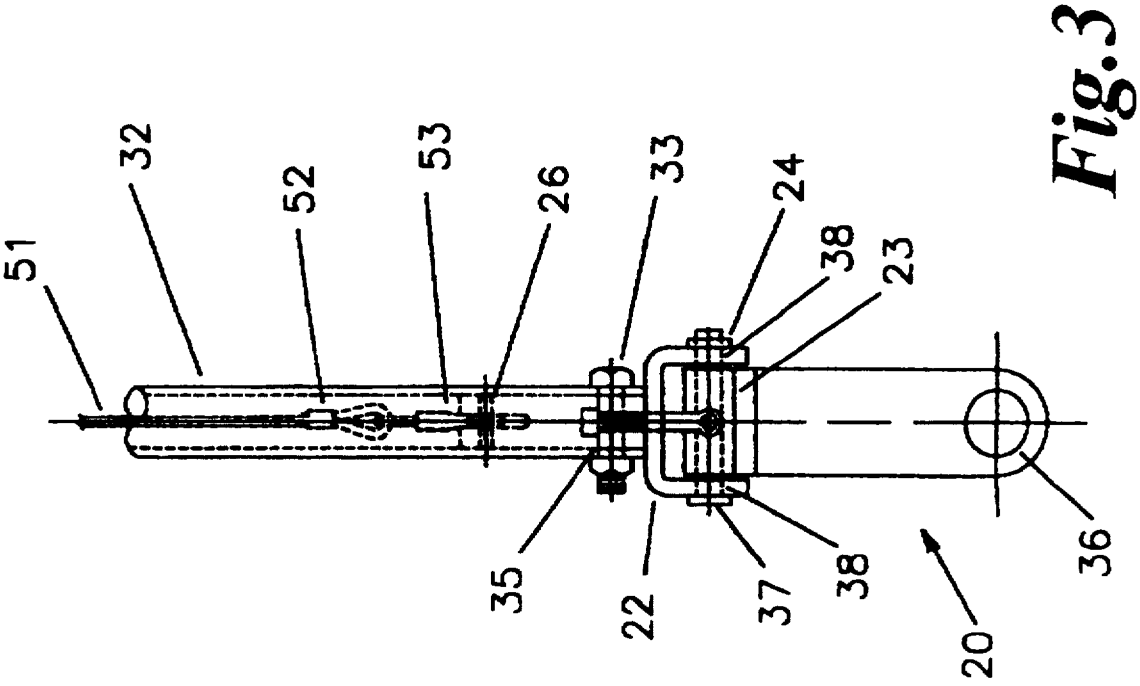
FIG. 3 is an enlarged front view of a portion of FIG. 2 showing a mechanism for holding a power tool attached to telescoping tube members.

Air powered balancer 50 is provided with cable 51 that feeds through telescoping tube members 30 as shown in FIG. 10 and is guided by rollers 54, which are attached to the top surface of rectangular plate 44. Rollers 54 are shown in FIG. 10, forming a square about the cable 51. cable 51 attaches to the mechanism for holding a power tool 20 by swivel connector 53. Swivel connector 53 is retained on cable 51 by crimp sleeve 52, as shown in FIGS. 3 and 4. By feeding cable 51 through telescoping tube members 30 and attaching it by a swivel connector 53 to rod 26, this allows the mechanism 20 for holding a power tool to rotate 360 degrees about the power tool and weight balancing device 15.

Telescoping tube members 30 attach to the balancer frame 40 by mounting plate 34 which mounts to the bottom surface of rectangular plate 44 by nut and bolt arrangement 46 as shown in FIG. 10. One end of outside tube member 31 is fixedly secured, by welding or other appropriate means, to mounting plate 34. The other end of outside tube member 31 accepts the first end of inside tube member 32. The other end of inside tube member 32 attaches to the mechanism 20 for holding a power tool by a nut and bolt arrangement 33 as shown in FIG. 3. The bolt of nut and bolt arrangement 33 fits first through hole 35 then through hole 27 on attachment block 25 as shown in FIGS. 3 and 4.

Figure 13:
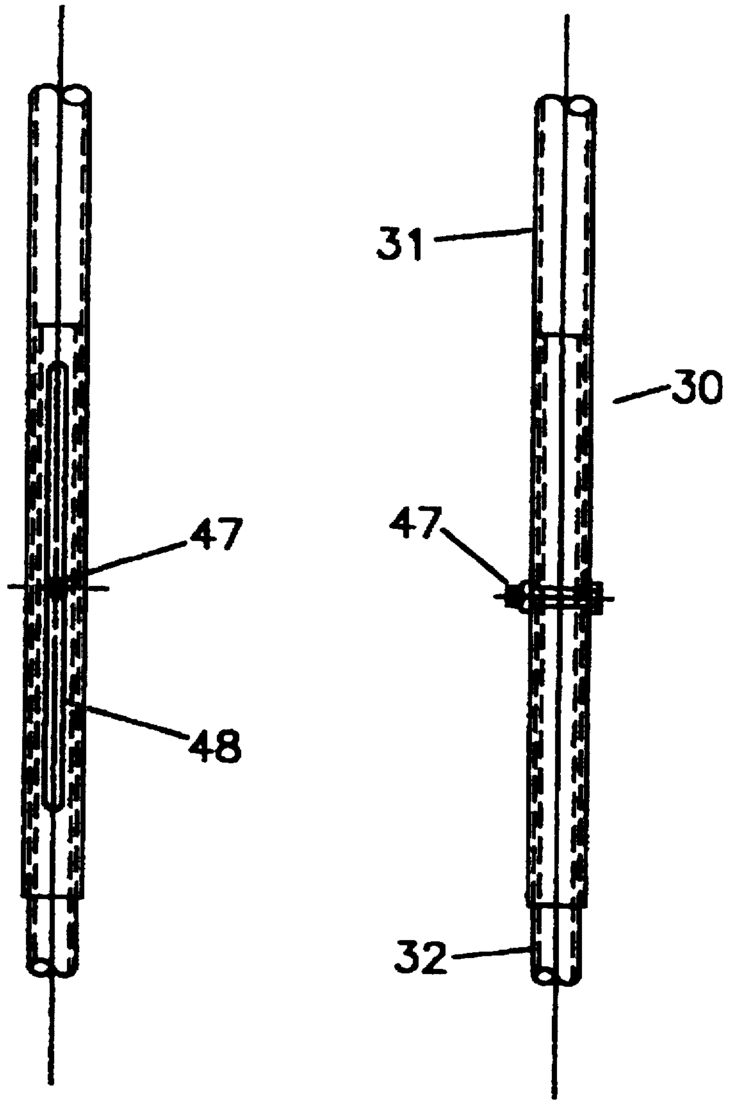
FIG. 13 shows the telescoping tube members of a circular cross section with a slot through both tubes and a nut and bolt through the slot to limit tube rotation of the tubes with a circular cross-section.

Inside and outside tube members 31 and 32 may be of circular or square cross-section. When inside and outside tube members are of a circular cross-section, as shown in FIG. 13, a vertical slot 48 may be introduced into the tube members, and a nut and bolt 47 may be inserted into the slot to stop inside tube member 32 from rotating.

Figure 8:
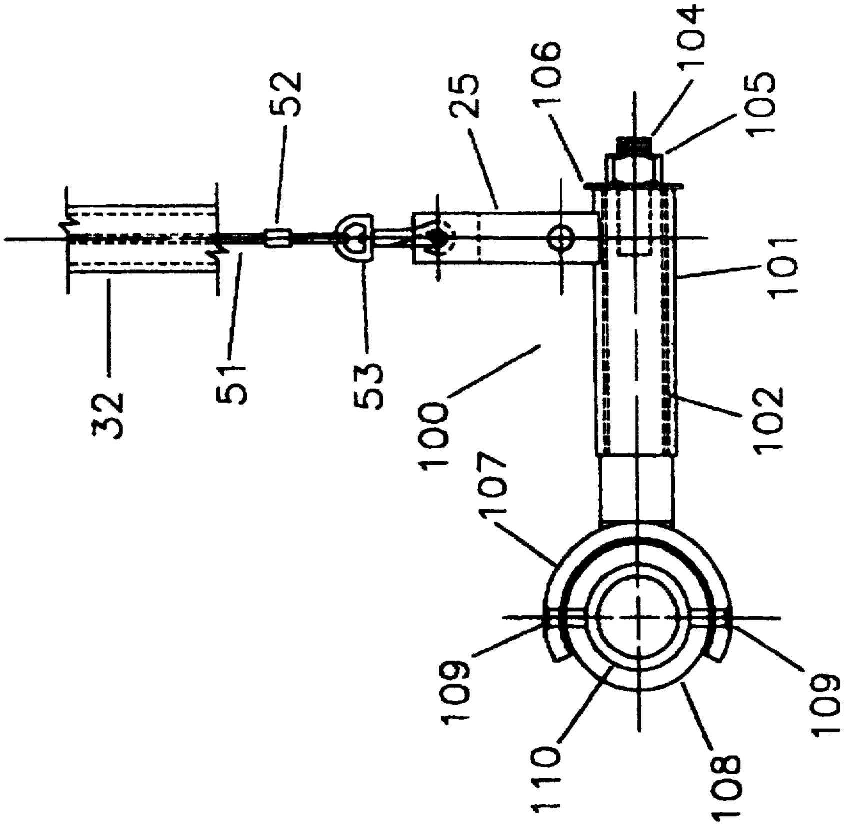
FIG. 8 is an enlarged side view of the second mechanism for holding a power tool of FIG. 7 showing the tool holding ring pivoted 90°.
Figure 7:
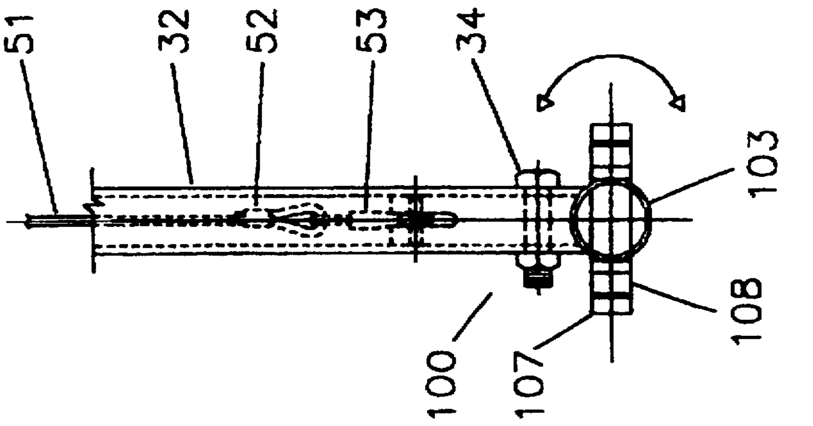
FIG. 7 is an enlarged view of the second mechanism for holding a power tool that is used with vertically oriented for operated power tools.

FIGS. 3, 4, 7, and 8 show a first and second embodiment of a mechanism for holding a power tool. FIGS. 3 and 4 show a first mechanism 20 for holding a power tool in a horizontal position. FIGS. 7 and 8 show a second mechanism 100 for holding a power tool in a vertical position. Either the first or second mechanism 20 or 100 for holding a power tool may be used on either embodiment of the power tool torque and weight balancing mechanism 15 or 16 as described.

As shown in FIGS. 3 and 4, first mechanism 20 for holding a power tool in a horizontal position consists of tool support bracket 21 having a top and side surface, a pivot support bracket 22 with rotational means and a cable hook attachment block 25. On the cable hook attachment block 25 is a rod 26 to which cable hook 53 attaches as shown in FIGS. 3 and 4. The side surface of tool support bracket 21 contains a hole 36 which is dimensioned to accept many size variations of horizontally mounted power tools. Sleeve 23 is welded to the top surface of tool support bracket 21 and is part of the rotating means that allows the tool angle to be adjusted in relation to the work piece. Set screw 29 tightens against shaft 37 to hold the tool support bracket 21 in a position selected by the operator. Pin 37 passes through holes 38 on pivot bracket 22 and sleeve 23 to enable the mechanism for holding a power tool to pivot for operator adjustment. Pin 37 is held in place by snap ring 24. Adjustment bolts 28 limit the movement of tool support bracket 21 as shown in FIGS. 3 and 4.

ALTERNATIVE EMBODIMENTS

Referring now to FIGS. 5 and 6 which illustrate a second embodiment of the power tool torque and weight balancing device 16, a four-roller trolley arrangement 81 engageable with and moveable along I-beam 80 is mounted at one end of trolley support plate 82 by nut and bolt arrangement 83. The other end of trolley support plate 82 is attached to second mounting frame 90 by nut and bolt arrangement 84. Second mounting frame 90 is a non-swiveling device that is used exclusively with the trolley version of the power tool torque and weight balancing device 16. Second mounting frame 90 contains center support bracket 91. Secured, by welding or other appropriate means, to center support bracket 91 are side support brackets 92 and 93. Bottom adjustment bracket 94 has a slot 95 for adjustment of the power tool torque and weight balancing mechanism 16 with respect to the location of the work piece and I-beam 80.

Figure 12:
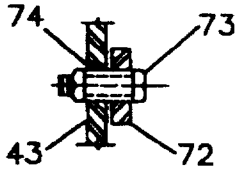
FIG. 12 is a cross-sectional view cut along the balancer support swivel shown in FIG. 6.

Balancer frame 40 is positioned on the second embodiment of the power tool torque and weight balancing device 16 in between bottom adjustment brackets 94 by nut and bolt arrangement 73 through bushing 74 as shown on FIG. 12. Balancer frame 40 may be used with either an air or spring powered balancer. FIGS. 5 and 6 show a spring balancer on the power tool torque and weight balancing device 16. Balancer frame 40 has balancer mounting means 41 secured by welding or other appropriate means, to mount spring powered balancer 50.

Spring powered balancer 50 has cable 51 that feeds inside telescoping tube members 30 as shown in FIG. 10 and guided by rollers 54 which are journaled for vertical rotation and are attached to the top surface of rectangular plate 44. Cable 51 is attached to the mechanism 20 for holding a power tool by swivel connector 53. Swivel connector 53 is retained on cable 51 by crimp sleeve 52 as shown in FIGS. 7 and 8. By extending cable 51 through telescoping tube members 30 and attaching it via swivel connector 53, the mechanism 100 for holding a power tool is able to rotate 360 degrees about the power tool and weight balancing device 16.

Telescoping tube members 30 attach to the balancer frame by mounting plate 34 which mounts to the bottom surface of rectangular plate 44 by nut and bolt arrangement 46 as shown in FIG. 10. One end of outside tube member 31 is secured, by welding or other appropriate means, to mounting plate 34. The other end of outside tube member 31 accepts the first end of inside tube member 32. The other end of inside tube member 32 attaches to the mechanism 100 for holding a power tool by nut and bolt arrangement 33 and 34 as shown in FIG. 7. Bolt 34 fits first through hole 35 then through hole 27 on attachment block 25 as shown in FIGS. 7 and 8.

FIGS. 7 and 8 show a second mechanism 100, which used for vertically operated power tools. Second mechanism 100 for holding a power tool consists of shaft support tube 101 secured, by welding or other appropriate means, to attachment block 25, as shown in FIG. 8. Shaft support tube 101 contains rotatable shaft 103 and bushing 102. One end of rotatable shaft 103 carries threaded rod 104. The other end of rotatable shaft 103 carries yoke support 107. Rotatable shaft 103 is stepped and held in shaft support tube 101 by nut 105 and washer 106. Yoke 108 is held in yoke support 107 by set screws 109. To hold the power tool, serrated tool holding ring 110 is secured to yoke 108.

SUMMARY OF THE ACHIEVEMENT OF THE OBJECTS OF THE INVENTION

From the foregoing, it is readily apparent that we have invented an improved method and apparatus for balancing power tool torque and weight forces of a power tool during its operation, which allows an operator to use both vertically and horizontally mounted power tools, as well as a device, the mounting of which may be either fixed or movable in relation to the workpiece.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A power tool torque and weight balancing apparatus, comprising:
   - a mounting frame having a first end, a second end and a pivoting member for allowing said second end to pivot relative to said first end;
   - a balancer frame having a first end and a second end and a lower mounting surface, said first end of said balancer frame being connected to said second end of said mounting frame;
   - a mechanism for holding a power tool including means for receiving a swivel connector;
     - said mechanism for holding a power tool comprising:
     - a tool support bracket having a top and side surface,
     - rotational means attached to said top surface of said tool support bracket; and
     - an attachment block connected to said rotational means on said top surface of said tool support bracket;
       - said rotational means comprising a sleeve attached to said top surface of said tool support bracket,
       - a pivot support bracket having a hole therethrough,
       - a pin having a first and second end,
       - said first end of said pin having a flat head,
       - said second end of said pin adapted to receive a snap ring, a snap ring engageable with said pin,
       - said pin being positioned within said sleeve, said pin connecting said pivot support bracket to said tool support bracket;
   - a balancer mechanism interposed within said first end and said second end of said balancer frame, said balancer mechanism having a cable with an end and a swivel connector attached to said end of said cable, said swivel connector attachable to said mechanism for holding a power tool;
   - telescoping tube members consisting of an inside tube and an outside tube, said inside tube being slidably disposed within said outside tube, said inside tube and said outside tube each having a fixed end and a free end, said fixed end of said outside tube being attached to said second end of said mounting frame, said fixed end of said inside tube being attached to said mechanism for holding a power tool.

2. Apparatus according to claim 1 wherein said telescoping tube members have an essentially circular cross-sectional form.

3. Apparatus according to claim 2 wherein said telescoping tube members are provided with a longitudinal slot in both said inside and outside tubes, said slot being adapted to receive a coupling device for preventing rotation of said inside tube within said outside tube.

4. Apparatus according to claim 1 wherein the cross-sections of said telescoping tube members are essentially square.

5. Apparatus according to claim 1 wherein said balancer mechanism is air powered.

6. Apparatus according to claim 1 wherein said balancer mechanism is spring powered.

7. Apparatus according to claim 1 wherein said second end of said balancer frame has rollers mounted thereon adapted to guide said cable on said balancer mechanism through said telescoping tube members.

* * * * *